Sept. 21, 1965 J. L. SLOW 3,207,916

ELECTRICAL PULSE DISTRIBUTOR FOR CONNECTING POTENTIAL TO A PLURALITY OF LEADS

Filed Jan. 31, 1961 3 Sheets-Sheet 1

Sept. 21, 1965 J. L. SLOW 3,207,916

ELECTRICAL PULSE DISTRIBUTOR FOR CONNECTING POTENTIAL TO A PLURALITY OF LEADS

Filed Jan. 31, 1961 3 Sheets-Sheet 2

United States Patent Office 3,207,916
Patented Sept. 21, 1965

3,207,916

ELECTRICAL PULSE DISTRIBUTOR FOR CONNECTING POTENTIAL TO A PLURALITY OF LEADS

John L. Slow, Taplow, England, assignor to British Telecommunications Research Limited, Taplow, England, a British company Filed Jan. 31, 1961, Ser. No. 86,139
Claims priority, application Great Britain, Feb. 10, 1960, 4,727/60
3 Claims. (Cl. 307—88.5)

The present invention relates to pulse generating equipment and is particularly concerned with arrangements suitable for use in time division communication systems, for instance those usually described as pulse code modulation systems. In such a system a so-called scanner circuit is required which will provide a series of similar control pulses occurring successively and at uniform time intervals and a number separate outlets.

Various methods have already been proposed for producing this result but they mostly suffer from some defect, for instance they are unduly expensive because they require a large number of components or they need high quality equipment in order to produce satisfactory operation. The chief object of the present invention is to provide a circuit for giving the desired facilities with high speed operation, which consists only of a small number of comparatively inexpensive transistors and related componets and furthermore will operate satisfactorily over a reasonably wide speed range if required.

According to the invention in an electrical pulse disstributor for connecting potential to a plurality of leads in turn in response to short pulses connected to a control lead at the appropriate repetition frequency, a corresponding plurality of transistors are arranged in a ring circuit with capacitive coupling from the collector of one to the base of the next and the collector circuit connected to the respective leads and a further transistor is arranged to have the control lead connected to its base and its emitter connected to the emitters of all the transistors forming the ring, the emitters being connected to a source of substantially constant current.

Figure 1:
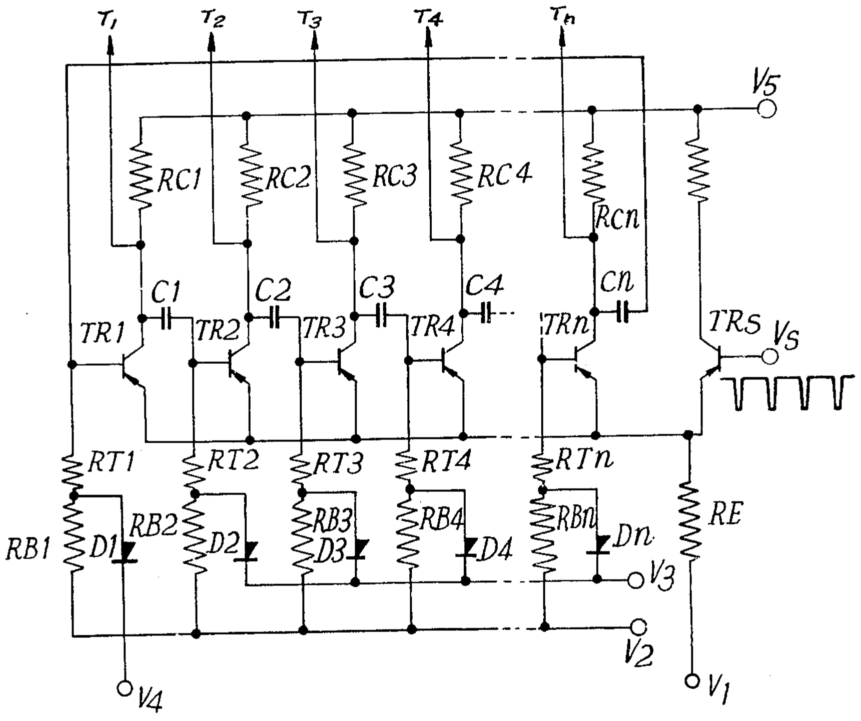
Figure 2:
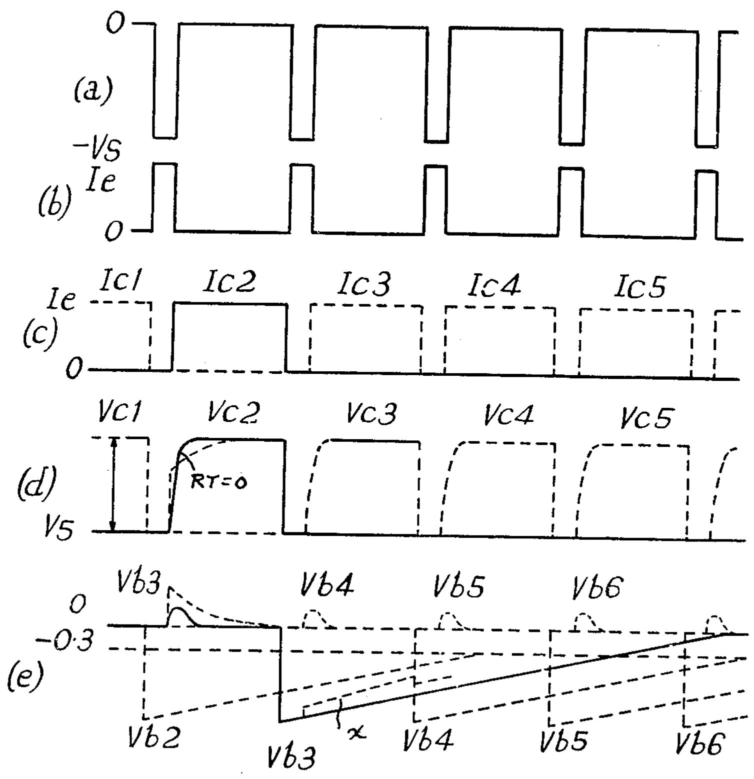
Figure 3:
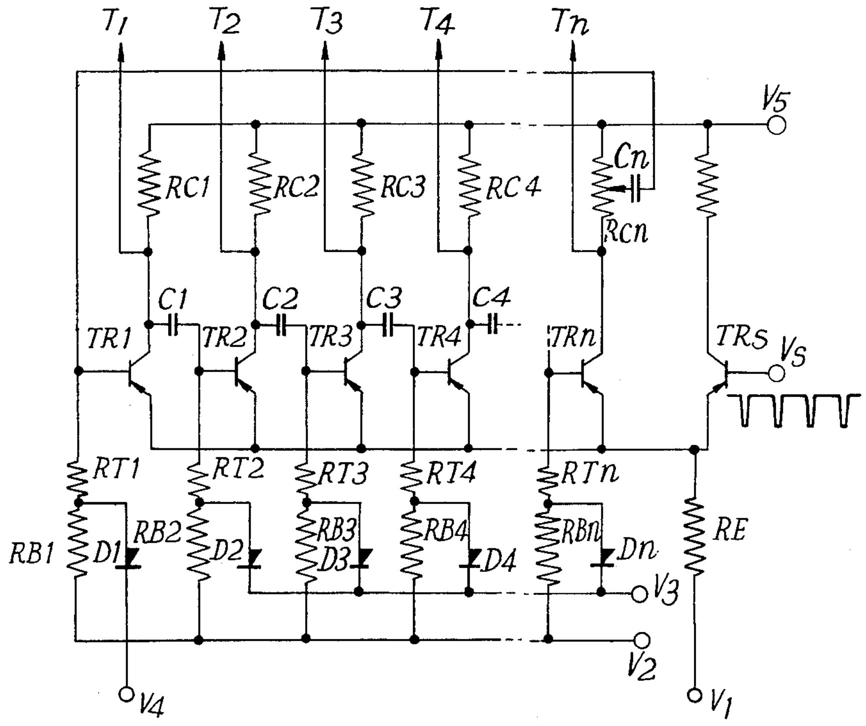

The invention will be better understood from the following description of one method of carrying it into effect which should be taken in conjunction with the accompanying drawings comprising FIGURES 1 and 2. FIGURE 1 shows a preferred circuit arrangement, while FIGURE 2 shows by means of suitable curves the various waveforms involved and FIGURE 3 is a slightly modified form of FIGURE 1. In these curves it is assumed that the negative-going control pulses are narrow and that the output pulses last from the end of one control pulse to the beginning of the next and are positive-going. In some instances it may be convenient for the control pulses to be so-called strobe pulses which are used for controlling other parts of the equipment, for instance the operation of toggle circuits.

As will be seen from FIGURE 1, transistors TR1, TR2 . . . TR*n* correspond to the number and sequence of output required. Transistors TR*s* is the control transistor and the negative-going control pulses are supplied over terminal V*s* to its base. The emitters of all the transistors are connected together to a common current source, for instance positive supply V1, which may be 24 volts, by way of resistor RE. With transistors so connected, all the current will flow through any transistor whose base is slightly more negative than those of the others. The bases of the transistors TR1 . . . TR*n* are connected to individual current sources in the form of resistors RB1, RB2 . . . connected to positive supply V2, which may conveniently be the same at V1, and clamped to voltage V3, which may be earth, by the diodes D2 . . . D*n*. Transistor TR1 however has its base clamped to voltage V4 by means of the diode D1 and V4 is slightly negative, for instance 0.3 volt, compared with voltage V3. The collector supply V5 may be about —6 volts. It will be noted that FIGURE 1 shows additional resistors RT1, RT2 . . . RT*n* in series with the various resistors RB respectively, but to simplify the understanding of the operation it will first be assumed that the RT resistors are zero. Capacitors C1, C2 . . . C*n* connect the collector of each transistor to the base of the next transistor, the collector of TR*n* being connected back to the base of TR1.

The operation of the curcuit will be most readily followed by consideration of the waveforms of FIGURE 2. Curve (*a*) represents the negative-going control pulses which are applied to the base of TR*s*, the potential being zero between pulses and making negative excursions of V*s*. Initially, because of the small negative potential on the base of TR1, the current through RE flows through TR1 whose collector will be at a potential positive with respect to V5 in view of the current flow through RC1. All the other transistors are cut off and their collectors are at potential V5. The amplitude of the control pulses is such that transistor TR*s* always conducts during the pulse and this is indicated in the curve (*b*) in FIGURE 2 which represents the control current through the transistor TR*s*. During this period all the other transistors are cut off, whatever the state of the circuit before the control pulse occurs. Thus with the conditions assumed, when the first control pulse occurs, TR*s* conducts and TR1 is cut off. The collector potential of TR1 falls as shown at Vcl in curve (*d*) in FIGURE 2 and as long as the charge on Cl remains unaltered, the base potential of TR2 also falls as shown at V*b*2 in curve (*e*) of FIGURE 2. At this point the diode D2 is cut off and C1 then discharges via RB2 at a rate initially determined by C1, V2 and RB2. At the end of the control pulse, the potential of the base TR*s* returns to zero and now since transistor TR2 has the most negative base potential, it conducts and serves to cut off the other transistors and modifies the discharge rate of C1 by the base charge and base current now being taken. This is indicated for transistor TR3 by the dotted line *x* in curve (*e*), FIGURE 2. In practice to avoid variations due to different transistors, it is desirable to make the discharge due to the base current appreciably smaller than that due to the current through RB and to simplify the ensuing description, it will be assumed to be negligible so that the discharge rate of the capacitor remains unchanged regardless of whether the transistor is conducting.

The discharge rate is suitably arranged so that the base of TR2 remains sufficiently negative to maintain the transistor in a conducting condition until the next control pulse. Thereupon TR*s* again conducts, this time cutting off TR2. The cycle of operations above described then repeats but this time when the control pulse ends and TR*s* is cut off, it is now TR3 which has the lowest base potential due to the collector of TR2 going negative on being cut off. Transistor TR3 therefore now conducts while C2 slowly discharges as shown in curve (*e*) in FIGURE 2. Meanwhile C1 continues to discharge until the base of TR2 is clamped to V3 by diode D2 again conducting.

The process continues in the same manner with the different transistors being switched on sequentially at the end of each control pulse and the sequence will repeat as long as the control pulses are applied. The outputs are obtained as positive-going pulses over the leads T1, T2 . . . T*n* from the collectors as shown in curve (*d*), FIGURE 2. Substantially rectangular collector current pulses are produced as shown in curve (*c*) since the switching times are determined only by the transistors operating under non-saturated conditions. The output collector voltage pulses however have the shape of the leading edge modified by the time constant of the collector circuit which with zero diode impedance is C.RC. This is shown in curve (*d*) in full lines marked $RT=0$. By the insertion of an additional series base resistance RT, the pulse leading edge can be sharpened as shown by the dotted line. This is done at the expense of increasing the charging time of the capacitor as indicated by the small positive-going excursions of the base voltage waveform in curve (*e*). This however is not important provided that the capacitor is still sufficiently charged within the available time, i.e. the period between successive control pulses.

If the control pulses cease, the circuit will return to the initial condition with TR1 conducting. This may be produced as a result of a free running movement round the ring back to TR1 but for many application this is no disadvantage. It may be noted that for the peak negative base voltage to be the same on all stages, the value of RC*n* must be less than the other collector resistors because this output is added to the small steady negative potential on the base of TR1. If this point is of consequence for the particular circumstances in which the circuit is being used, it may be dealt with by arranging that the collector resistors are provided with tappings from which the connections to the capacitors extend. In the case of resistor RC*n*, the tapping point is changed slightly so that the resistance value included is somewhat smaller than in the case of the other RC resistors. This method of compensation is illustrated in FIGURE 3 which shows the simplified form in which only the resistor RC*n* is in fact tapped. By this means compensation is provided for the voltage V4 without there being any alteration in the potential of the collector to which lead T*n* is connected.

In some cases it may be desirable to have the output in the form of pulses which are the same length as the control pulses rather than equal to the interval between them. This may readily be achieved by using a positive-going control input to TR*s*. If the positive peaks are at zero volts, the waveforms of FIGURE 2 still apply if the width of the negative-going control pulses is considered as increased to a point when only narrow positive pulses are left. The output waveform represented by curve (*d*) then also consists of narrow positive-going pulses. In this case however, the time available for the capacitor to charge through the diode is only the duration of the control pulse. This adds to the design difficulties of the circuit and it may not be possible to include the additional resistor RT to sharpen the leading edge of the voltage pulses.

I claim:

1. An electrical pulse distributor comprising in combination a plurality of transistors each including a base electrode, an emitter electrode and a collector electrode, a like plurality of capacitors, connections between said transistors forming a ring circuit with the capacitors respectively connected between the collector of one transistor and the base of the next, a first current source, a like plurality of resistors connected respectively between the collectors of said transistors and said first current source, a plurality of output leads connected respectively to the collectors of said transistors, a second current source, a further transistor including a base electrode, an emitter electrode and a collector electrode, connections from the emitter of said further transistor to the emitters of all said plurality of transistors and to said second current source, a like plurality of diodes, a first fixed potential source, a second fixed potential source of slightly different value, a connection from the base of one of said transistors by way of one of said diodes to said first potential source, connections from the bases of the remainder of said transistors respectively by way of the remainder of said diodes to said second potential source, a control lead connected to the base of said further transistor, and means for connecting pulses at a predetermined frequency to said control lead whereby different ones of said plurality of transistors are individually rendered conducting in turn and serve to alter the potential of said output leads in turn and in the absence of said pulses said one transistor remains conducting.

2. An electrical pulse distributor as claimed in claim 1 in which the value of the one of said plurality of resistors associated with the transistor immediately preceding said one transistor in the ring is less than the value of the remainder of said resistors so as to compensate for the differences between the values of said first and second fixed potentials.

3. An electrical pulse distributor as claimed in claim 1 in which the one of said plurality of resistors associated with the transistor immediately preceding said one transistor in the ring is tapped and the connection to the base of said one transistor is taken from the tapping on the resistor instead of from the collector of said preceding transistor so as to compensate for the difference between the values of said first and second fixed potentials.

References Cited by the Examiner

UNITED STATES PATENTS

| | | | |
|---|---|---|---|
| 2,512,984 | 6/50 | Trousdale | 328—43 |
| 2,542,644 | 2/51 | Edson | 328—43 |
| 2,802,052 | 8/57 | Brewster | 307—88.5 |
| 2,848,628 | 8/58 | Altschul | 307—88.5 |
| 2,857,554 | 10/58 | Watson | 315—84.5 |
| 2,860,259 | 11/58 | Odell et al. | 307—88.5 |
| 2,876,365 | 3/59 | Slusser | 307—88.5 |
| 2,906,870 | 9/59 | Huntley et al. | 328—106 |

ARTHUR GAUSS, *Primary Examiner.*

JOHN W. HUCKERT, *Examiner.*